(No Model.) 3 Sheets—Sheet 2.
E. E. STARR.
GALVANIC BATTERY.
No. 385,147. Patented June 26, 1888.
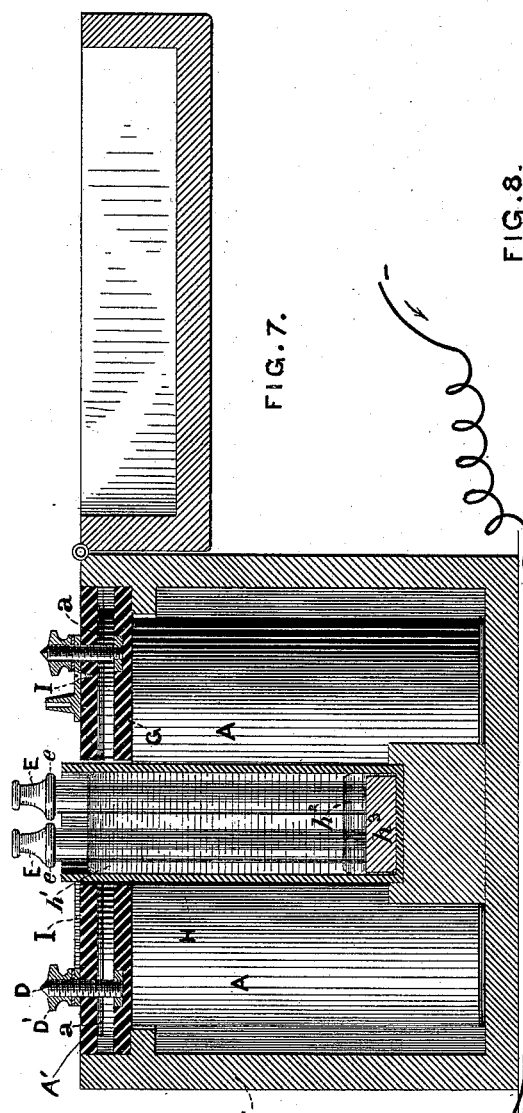
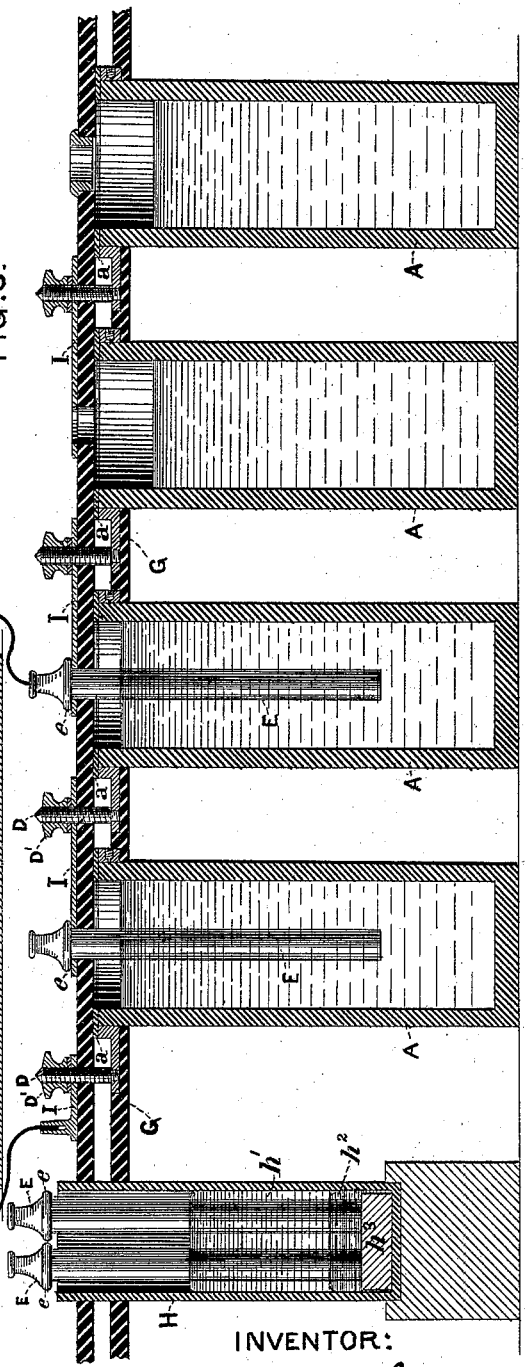
WITNESSES:
Jos. K. Evans.
Eli L. Starr.
INVENTOR:
E. Eugene Starr,
by his Atty Wm. J. Preston (No Model.) 3 Sheets—Sheet 3.

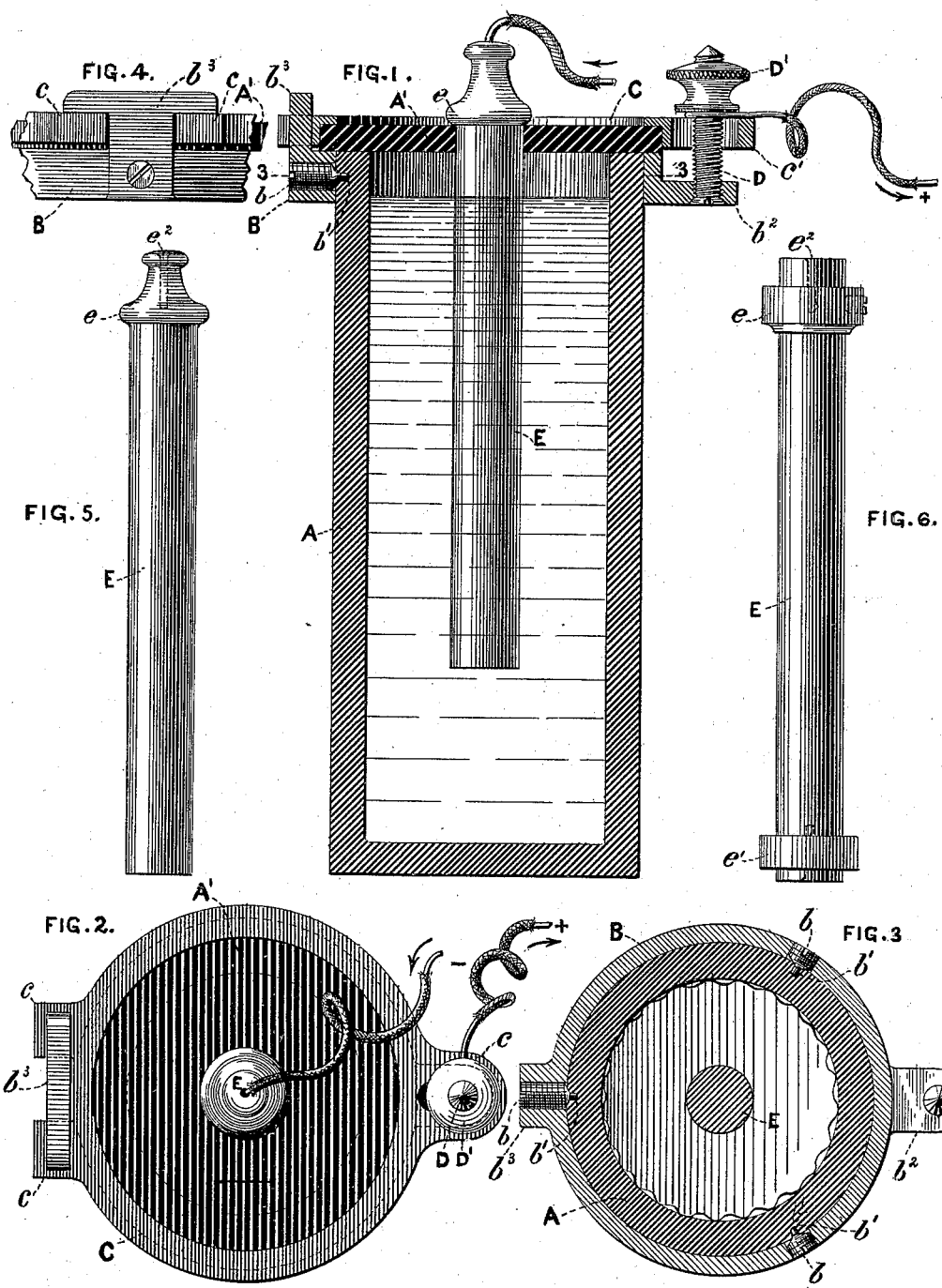

E. E. STARR.
GALVANIC BATTERY.

No. 385,147. Patented June 26, 1888.

WITNESSES:
Jos. K. Evans.
Eli T. Starr.

INVENTOR:
O. Eugene Starr
by his Atty
Wm. F. Peyton.

UNITED STATES PATENT OFFICE.

E. EUGENE STARR, OF PHILADELPHIA, PENNSYLVANIA, ASSIGNOR TO THE S. S. WHITE DENTAL MANUFACTURING COMPANY, OF SAME PLACE.

GALVANIC BATTERY.

SPECIFICATION forming part of Letters Patent No. 385,147, dated June 26, 1888.

Application filed April 25, 1885. Serial No. 163,388. (No model.)

*To all whom it may concern:*

Be it known that I, E. EUGENE STARR, of the city and county of Philadelphia, in the State of Pennsylvania, have invented certain new and useful Improvements in Galvanic Batteries, of which the following is a specification.

My invention relates to improvements in the mechanical construction, organization, and arrangement of the parts of a galvanic battery; and its objects are generally to provide a comparatively cheap, durable, and effective galvanic cell or arrangement of such cells into a battery for the generation of electricity.

The particular object of my invention is more especially to improve the arrangement and organization of the zinc and carbon couple and battery, to the end that polarization may in a great measure be retarded or prevented, and so that the current generated will be one of high electro-motive force, while of a uniform and constant character.

The subject-matter claimed is particularly set forth in detail in the description that follows, the organizations thus particularly described being the best embodiments of my invention now known to me. It is to be understood, however, here at the outset, that some of my improvements claimed herein by me may be used without the others and in batteries and cells not organized like those particularly described herein in exemplification of my improvements.

Figure 9:
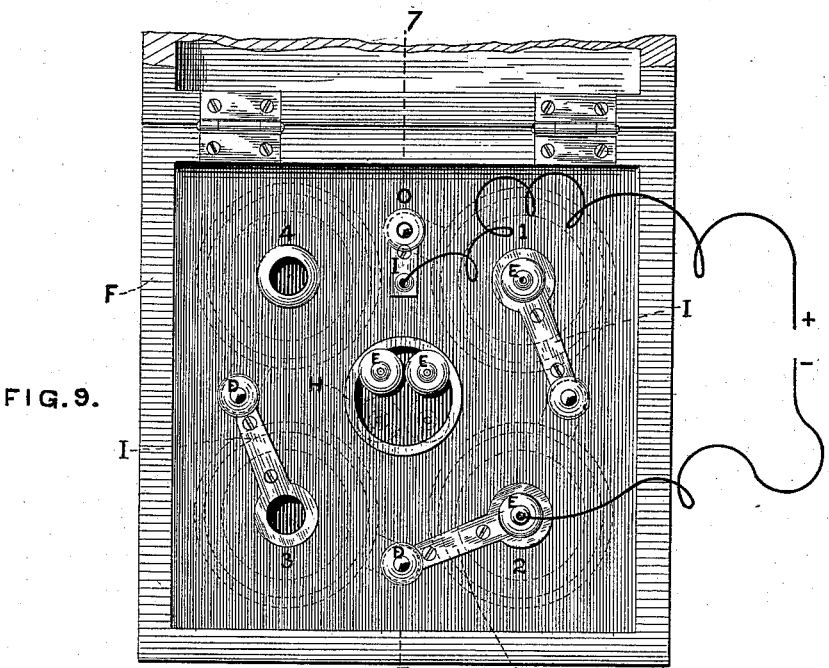
Figure 10:
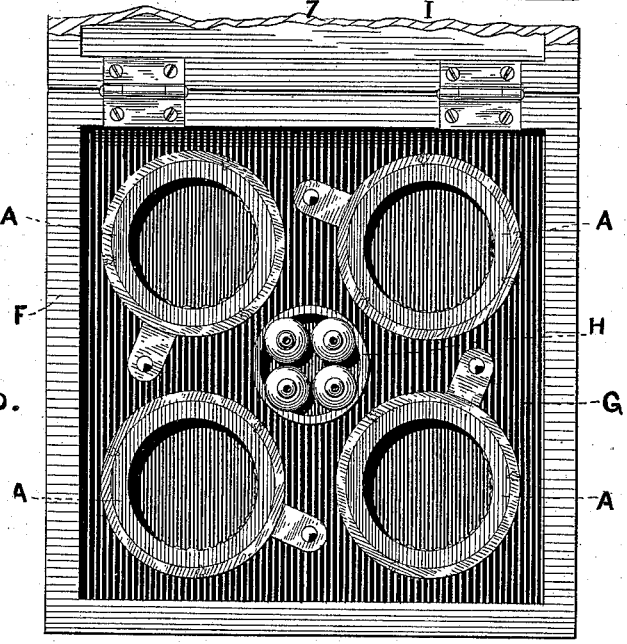

In the accompanying drawings, Figure 1 is a sectional view of one of my improved battery-cells. Fig. 2 is a plan or top view thereof, and Fig. 3 is a cross-section through on the line 3 3 of Fig. 1. Fig. 4 is a view of a portion of the upper end of one of my improved cells, showing more particularly the locking-connection at one side of the cell between the cell and the clamp-ring of the cover thereof. Fig. 5 is a view of the zinc electrode with enlarged head or shoulder, by which the electrode is suspended in the battery-cell from the cover thereof; and Fig. 6 is a view of a modified zinc electrode rendered reversible by me for its more thorough consumption and utilization. Fig. 7 is a sectional view on the line 7 7 of Fig. 9 of my improved battery, several cells being arranged in a box with proper connections, and said box being also provided with a preserving-vessel for the zinc electrodes when not in actual use. Fig. 8 is a sectional diagrammatic view, the cells being arranged in line, with two of them coupled up for action. This view is more especially intended to illustrate clearly the manner of suspending the battery cells from their support, the manner of arranging and clamping the cover of said cells, and the construction and organization of the coupling-connections. Fig. 9 is a plan or top view of the organized battery, with four cells and the preserving-vessel, showing more particularly a plan of the coupling-conducting connections between the cells. In this view the lid of the battery-box containing the battery-cells is thrown back or open, as in Fig. 7. Fig. 10 is a plan view with the lid or cover of the battery-cells removed, showing more particularly the manner of organizing the battery-cells with reference to the non-conducting support from which they are suspended in the battery-box.

I will first describe my improved cell as a single cell or couple and then the organization of several cells to form a battery.

The cell is composed of a carbon cup, A. This cup constitutes as well the liquid-containing vessel of the cell as one of the electrodes thereof. It is made of carbon molded, preferably, under pressure, as well known in the art. Carbon is porous, and to make it capable of holding the battery-fluid, while leaving its inner surface to act as one of the electrodes, I varnish or coat the periphery, the outside of the cup-sides, and bottom with a non-conducting impenetrable coating of acid-proof material, such as asphaltum, paraffine, &c. Asphaltum is preferred. This may be done by first heating the carbon cup and then applying asphaltum varnish or liquid asphaltum with a brush, or by dipping the cup into the liquid material. The heated cup absorbs the asphaltum on its surface and makes it impervious. After the first application other coatings of the material are applied, so as to produce a comparatively thick and uniform covering upon the outside of the carbon cup. The asphaltum or other material with which the outside of the carbon cup is coated may be mixed or compounded with other ingredients for better effect in some cases—such as plaster-of-paris or finely-divided quartz—to make a harder or more durable coating, for example.

The inside of the carbon cup A may be corrugated to increase its active surface, and this is shown in Fig. 3.

The upper end of the carbon cup A is surrounded by a metal ring, B, which constitutes the terminal of the carbon electrode and serves other purposes which will appear. The carbon cup is cylindrical, and the ring-terminal B is united thereto by screw-pins $b$, arranged around the ring at suitable distances apart, which are provided at their inner ends with platinum tips $b'$, soldered or otherwise connected to the screws $b$, the purpose of which platinum tips is to secure a non-oxidizable and good electrical contact with the carbon, and thus a good electrical connection between the carbon and its terminal ring. Said terminal ring B has at one side an ear or lug, $b^2$, and at the opposite side a rising T-shaped piece, $b^3$.

The cup A has a non-conducting cover, A', preferably of flexible compressible rubber, and this cover is clamped on the upper end of the cup A, so as to close it fluid-tight, by a clamp-ring, C, one side of which is provided with ears $c\ c$ to fit under the head of the T-piece $b^3$ of the terminal ring B, and the opposite side of which is provided with a slotted lug, $c'$, corresponding to the lug $b^2$ of said ring B. A screw or bolt, D, passes up from the lug $b^2$ of the ring B through the slotted lug $c'$ of the clamp-ring C, and is fitted with a thumb or clamp-nut, D'. With the cover A' in place, and the ears $c\ c$ of the clamp-ring C engaged with the head of the T-piece $b^3$ of the ring B, and the screw-bolt D passing through the slotted lug $c'$ of said ring C, a mere tightening of the nut D' securely clamps the cover A' in place on the cup A and seals it fluid-tight. A slot is made in this flexible rubber cover to allow of the escape of gas that may collect when the pressure is sufficient to open the slot and escape. When the pressure is released, the slot closes. To remove the cover, the nut D' is loosened and the clamp-ring C moved endwise on the screw D to disengage its ears $c\ c$ from the T-piece $b^3$ of the ring B, and when this is accomplished the clamp-ring and the cover may be swung around to permit free access to the interior of the carbon cup. It will be obvious that the same result would follow from the above construction were the cover A' of some stiff or rigid non-conducting material—such as a molded compound of asphaltum, for instance—and a packing-ring of rubber or some equivalent employed between the cover and cup to secure a tight joint.

In addition to securing the cover on the battery-cell, the clamp-nut D' may be employed to secure a good connection between the terminal ring B and the circuit-wire or the connections between two cells of a battery by making good contact therewith.

The other electrode than the carbon cup is preferably the usual zinc in the form of a rod, E, the upper end of which is enlarged or headed so as to suspend the rod within the carbon cup when its body or active portion is inserted through a central opening in the cover A' of the cell.

Owing to the elasticity of the cover A', if of rubber, a tight joint is formed between the cover A' and the zinc rod E. The arrangement of carbon and zinc electrodes above described obviously gives large carbon surface within small space, and there also results a uniform relation of the zinc to the carbon. Further than this the tight sealing or closing of the cell prevents evaporation of the battery-liquid and corroding of the connections. In place of the usual headed or enlarged zinc rod E, I may employ a zinc rod having a plain cylindrical body with an adjustable or removable ring, enlargement, or shoulder, $e$, at one end and a protecting ring or band, $e'$, at the opposite end. By the removable shoulder or enlargement $e$ the zinc rod may be suspended from the cover of the cell, as in case of the rod shown in Fig. 5, first described, while the portion of the rod covered by the band $e'$ will be protected from consumption in the action of the battery. When the lower or active end of the rod has been sufficiently consumed or destroyed by the action of the battery, the rod is removed, and the enlargement $e$ is removed and applied to the opposite end of the joint before protected from corrosive action. The rod may now be reinserted in the cell with its upper end lowermost, or, in other words, the rod be reversed for the more complete and economical consumption of the zinc electrode.

Instead of a protective ring or band, $e'$, which may be removed (as rubber, for instance) when the zinc electrode is to be reversed, the protection may be afforded by suitably coating or varnishing the rod at the joint desired to be preserved, to enable a good connection to be made on reversal. The reversible zinc is preferably socketed at each end, as at $e^2$, to facilitate connection with the circuit-wires, as clearly shown in Fig. 6. The socket at the lower end is plugged up until the rod is reversed.

I will now describe the organization of the improved cell into a battery of several cells with their containing-box and a preserving-vessel for the zinc electrodes when not in use. The battery to be described is one having four cells; but the number of cells may of course be varied according to the power of the battery desired or the work to be done by it.

The battery-box F has a non-conducting support, G, of hard rubber, for example, and the cells are fitted in openings therein, so as to be suspended clear of the bottom of the box, resting upon their terminal rings, for example, the cells being preferably arranged in the battery-box, as shown in Figs. 7, 9, and 10, so as to leave a central space for the preserving-vessel H, which may be supported at the bottom by a block, $h$, in the center of the box.

Above the support G of the battery-box the cover A' of the cells is arranged, the cover A' being preferably, though not necessarily, of a single piece of non-conducting material—hard rubber, for example—and clamped in place to close the cells fluid-tight by means of the clamp-nuts D', which work upon the threaded bolts or screws D, rigidly united to the lugs $b^2$ of the terminal rings B of the battery-cells, and rising upward through openings in the cover-plate A' and through openings in the conducting coupling-strips I, of copper preferably, by which the cells are connected with one another. Suitable packing rings or gaskets, $a$, are interposed between the cover-plate A' and the tops of the battery-cells, as clearly shown in Figs. 7 and 8, to insure a fluid-tight joint. The coupling-strips I are fastened securely to the top of the non-conducting cover A', and the opposite ends of said strips to those clamped by the nuts D' of the screw-bolts D are extended over their respective cups A, so that when the shouldered zinc rods are in place they pass through said coupling or connecting conducting-strips, and with the fluid of the cells complete the circuit made by the circuit-wires when connected together by a translating device or device to be operated by the current generated by the battery.

In Figs. 8 and 9, for instance, but two of the cells are connected up in tension for work. The circuit starts from the zinc electrode of cell marked No. 2 in Fig. 9 through the cell to the carbon cup, thence by way of the terminal of said cup and the connecting coupling-strip I between cells Nos. 1 and 2, to the zinc of No. 1, thence through the cell to the carbon of No. 1, and by way of the connection marked O to the line or circuit wire and back to the zinc-rod of No. 2. More or less of the cells may be readily coupled up for action by inserting the zinc rods in place and properly connecting the circuit-wires, each zinc having a socket in its upper end to facilitate these connections.

It will be obvious from what has been said that my improved battery is readily put together and may be readily taken apart for any necessary purpose. So, also, any number of cells may be used, as desired. To save useless consumption of the zincs when the battery is not doing useful work, the battery-box is provided with what I call a "preserving" or "protecting" vessel. This vessel H is partially filled with water, $h'$, or other cleansing-fluid, and also has a layer or short column of mercury, $h^2$. Its bottom is furthermore lined or provided with a cushion of rubber, cork, or other suitable substance, $h^3$. When the battery is not in action, the zincs are lifted out of their respective cells and dropped into the preserving-vessel H. The cushion at the bottom of said vessel takes the jar or concussion of the falling zincs, the water or fluid in said vessel cleanses said zincs of acid, which would otherwise act destructively on them, and the mercury keeps the zincs properly amalgamated.

I have thus set forth my several improvements sufficiently in detail to be understood by those skilled in the art, and have recited so much of the advantages thereof as I deem material and necessary to be recited, and I therefore conclude by stating that I claim herein as of my invention each and all of the following recited improvements, to wit:

1. The carbon electrode constituting the containing-vessel of the cell and provided with a surrounding metal terminal ring, said ring being united to said electrode by fastening devices, substantially as described.

2. A cylindrical carbon electrode having a surrounding metal band or ring at its top united to the carbon cylinder by screws having non-oxidizable points.

3. A battery-vessel having a surrounding band or ring at its top detachably connected therewith and forming an electrical connection with said vessel, substantially as described.

4. A battery-vessel having a surrounding band or ring at its top detachably connected therewith and forming an electrical connection with said vessel, a lid or cover resting on said ring, and a clamp-ring having connections with said first-mentioned band or ring to clamp said cover in place, substantially as described.

5. A battery-vessel forming one electrode of a battery, having a terminal ring at its top provided with a locking-piece at one side and a clamp-screw at the side opposite thereto, a cover for said vessel, with an opening therein for the entrance of the other electrode, and a clamp-ring above said cover having a connection with said locking-piece and said clamp-screw, substantially as described, whereby the cover may be securely clamped in place to close said vessel.

6. The combination, with the flexible or elastic top of a battery-vessel having a hole therein for the passage of an electrode, of an electrode having a body portion fitted to pass through said opening, and provided with an enlargement or shoulder at or near its end to rest upon said cover and be supported thereby, substantially as described, whereby said electrode is readily removed from the battery-vessel and readily inserted in place, while the opening closely fits the electrode to make the cell fluid-tight.

7. An electrode having a detachable shoulder band or enlargement at or near one end and a detachable ring or gasket at or near its opposite end to protect it at that point, substantially as described, whereby when the unprotected portion of the electrode in the battery-fluid is consumed the shoulder or enlargement may be detached and applied to the opposite end at the place before protected by the ring or gasket and secured thereto, so as to permit the opposite end of the electrode to be immersed in the battery-fluid, and thus insure a more thorough consumption of said electrode, as set forth.

8. A battery-electrode having one end of its active portion or body which is immersed in the battery-fluid protected or shielded, so as to render the electrode readily reversible, substantially as described.

9. A reversible battery-electrode having a socket at each end for making the circuit-connections, the socket which is immersed being protected from corrosive action by the insertion of a plug therein, substantially as described.

10. A reversible battery-electrode having a socket at each end for connections and a removable suspending shoulder or enlargement at or near one of said ends and a protection for a portion of the electrode at or near the other of said ends, substantially as described.

11. In a galvanic battery having an electrode-preserving vessel or cup containing a cleansing-liquid, a layer or column of mercury to amalgamate the electrodes placed therein, substantially as described.

12. A galvanic-battery apparatus having an electrode-preserving vessel or cup containing a layer or column of mercury to amalgamate the electrodes placed therein, substantially as described.

13. In a preserving vessel or cup to receive the electrodes of a galvanic battery when not in action, a cushion to receive the jar of the entering electrode, substantially as described.

14. In combination with a galvanic battery, a battery-box having a non-conducting support near its top, with an opening or openings therein through which the battery cell or cells are suspended, substantially as described.

15. In combination with a galvanic battery, a battery-box having a non-conducting support near its top, from which the battery cell or cells are suspended, and a detachable cover above said support for said cell or cells clamped upon the upper open end or ends of said cell or cells, substantially as described.

16. In combination with a galvanic battery, a battery-box having a non-conducting support near its top, from which two or more battery-cells are suspended, and a lid or cover for said cells having the coupling connection or connections for said cells attached thereto, substantially as described.

17. In a galvanic battery, the combination of a battery-box having a non-conducting support near its top, two or more carbon or equivalent cells suspended from said support, a lid or cover for said cells carrying the conducting coupling connection or connections for said cells, and the zinc or equivalent electrode or electrodes of said cells, completing the connection when in place by contact with said coupling connection or connections, substantially as described.

18. The combination, in a galvanic battery, of the series of carbon containing-vessels forming one series of the electrodes of the battery, the terminal rings thereof, and the circuit-connections united at one end to said terminal rings and fitted with openings at the other ends thereof, through which the zinc electrodes are suspended in the battery-liquid, thereby forming an electrical connection between the electrodes of the series of vessels or cells by simply inserting the zincs through said connections, substantially as described.

Signed at Philadelphia, Pennsylvania, this 22d day of April, 1885.

E. EUGENE STARR.

Witnesses:
   GEO. P. MORGAN,
   ALBERT P. ROOT.